(12) United States Patent
Kunkel (10) Patent No.: US 12,134,523 B1
(45) Date of Patent: Nov. 5, 2024

(54) SYSTEM AND METHOD FOR AUGER INSTALLATION AND REMOVAL

(71) Applicant: Joseph D. Kunkel, Hinton, IA (US)

(72) Inventor: Joseph D. Kunkel, Hinton, IA (US)

( * ) Notice: Subject to any disclaimer, the term of this patent is extended or adjusted under 35 U.S.C. 154(b) by 97 days.

(21) Appl. No.: 18/110,578

(22) Filed: Feb. 16, 2023

Related U.S. Application Data

(60) Provisional application No. 63/389,615, filed on Jul. 15, 2022.

(51) Int. Cl.
*F16M 13/02* (2006.01)
*B65G 33/08* (2006.01)
*B65G 33/24* (2006.01)

(52) U.S. Cl.
CPC ............. *B65G 33/24* (2013.01); *B65G 33/08* (2013.01); *F16M 13/02* (2013.01)

(58) Field of Classification Search
CPC ........ B65G 33/24; B65G 33/08; B65G 31/04; B65G 19/165; B65G 65/30; B65G 65/46; B65G 65/466; B65G 2201/04; B65G 2201/042; B65G 2201/045; B65G 2201/047; B65G 2201/06; F16M 13/02; A01K 5/0258; A01K 39/01
USPC ......................................... 198/657, 57.2, 716
See application file for complete search history.

(56) References Cited

U.S. PATENT DOCUMENTS 3,776,191 A * 12/1973 Murto ..................... A01K 39/01
119/57.3
3,918,862 A * 11/1975 Bellew ..................... A23G 3/20
425/114
4,149,659 A * 4/1979 Reed ....................... A01K 39/01
119/901
4,207,995 A * 6/1980 Neely .................... A47J 31/404
222/231
4,495,894 A * 1/1985 Swartzendruber ... B65G 19/165
119/57.2
4,640,230 A * 2/1987 Van Rooijen ........ B65G 19/165
198/716
4,667,623 A * 5/1987 Swartzendruber ....... A01K 5/02
119/57.2
4,850,307 A * 7/1989 Sheets .................... A01K 39/01
119/57.2
RE33,456 E * 11/1990 Van Rooijen ........ A01K 5/0258
198/716

(Continued)

FOREIGN PATENT DOCUMENTS

WO    WO-2022075910 A1 *  4/2022

*Primary Examiner* — Gene O Crawford
*Assistant Examiner* — Muhammad Awais
(74) *Attorney, Agent, or Firm* — Suiter Swantz IP (57) ABSTRACT

A system for installing or removing an auger from a device is disclosed. The system may include a hollow tube, the hollow tube including a first opening at a first end of the hollow tube and a second opening at a second end of the hollow tube, the hollow tube including a hole in a surface of the hollow tube, a mounting assembly, the mounting assembly being attached to the hollow tube, the mounting assembly including an axle, and a sprocket, the sprocket including a plurality of vertices, wherein the sprocket is attached to the axle and configured to mesh with pitches of a helix of the auger via the hole in the surface of the hollow tube, wherein the sprocket is configured to rotate and move the auger through the hollow tube, and to or from the device.

18 Claims, 10 Drawing Sheets

(56) References Cited

U.S. PATENT DOCUMENTS

| | | | | |
|---|---|---|---|---|
| 5,335,619 A | * | 8/1994 | Pollock | B65G 19/16 |
| | | | | 119/57.4 |
| 5,605,113 A | * | 2/1997 | Krehl | A01K 39/01 |
| | | | | 119/57.2 |
| 5,964,184 A | * | 10/1999 | Hart | G01F 13/003 |
| | | | | 222/410 |
| 2014/0246361 A1 | * | 9/2014 | Biss | B65D 88/60 |
| | | | | 209/346 |
| 2015/0136567 A1 | * | 5/2015 | Sun | B65G 33/26 |
| | | | | 198/662 |

\* cited by examiner

SYSTEM AND METHOD FOR AUGER INSTALLATION AND REMOVAL

CROSS REFERENCE TO RELATED APPLICATIONS

The preset application claims the benefit under 35 U.S.C. § 119 (e) of U.S. Provisional Application Ser. No. 63/389,615 filed Jul. 15, 2022. The U.S. Provisional Application Ser. No. 63/389,615 filed Jul. 15, 2022 is hereby incorporated by reference in its entirety.

FIELD

The present disclosure is related to the field of agriculture, and more specifically to a system for the installation and removal of an auger.

BACKGROUND

Auger systems, particularly in agricultural and industrial settings may include augers that are very long. In these instances, a large group of individuals may be needed to feed the auger into the device where it will be used. Further, this could take the group a large amount of time. The amount of people, in combination with the amount of time necessary to install an auger makes it a very inefficient process and may result in other operations being negatively impacted. Therefore, there is a need for a more efficient way to install and/or remove an auger.

SUMMARY

A system for installing and removing an auger to or from a device is disclosed. The system may include a hollow tube, the hollow tube including a first opening at a first end of the hollow tube and a second opening at a second end of the hollow tube, the hollow tube including a hole in a surface of the hollow tube, a mounting assembly, the mounting assembly being attached to the hollow tube, the mounting assembly including an axle, and a sprocket, the sprocket including a plurality of vertices, wherein the sprocket is attached to the axle and configured to mesh with pitches of a helix of the auger via the hole in the surface of the hollow tube, wherein the sprocket is configured to rotate and move the auger through the hollow tube, and to or from the device.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details.

A system and method are disclosed for installing or removing an auger from a device requiring an auger. The system and method may be used with an existing piece of equipment or a device and a corresponding auger in order to reduce an amount of time and people required to install the auger or remove the auger. It is contemplated that any type of auger may be installed or removed by the system and method disclosed, including a shaftless auger, flex auger, centerless auger, and the like.

Figure 1:
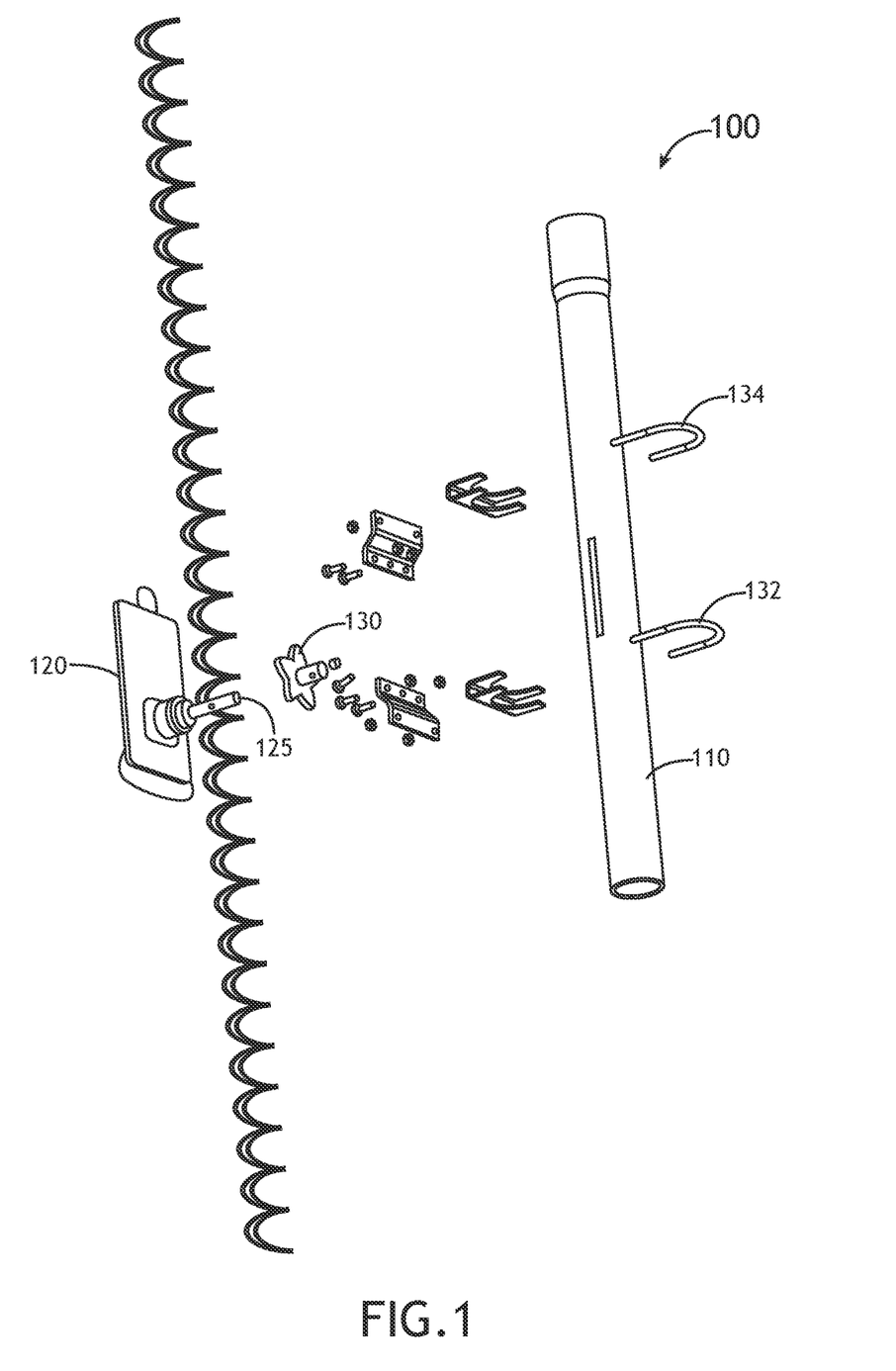
FIG. 1 depicts components of a system for installing or removing an auger in accordance with an exemplary embodiment of the present disclosure

Referring to FIG. 1, system 100 for installing or removing an auger may include a hollow tube 110, the hollow tube 110 including a first opening at a first end of the hollow tube 110 and a second opening at a second end of the hollow tube 110, the hollow tube 110 including a hole in a surface of the hollow tube 110, a mounting assembly 120, the mounting assembly 120 being attached to the hollow tube 110, the mounting assembly 120 including an axle 125, and a sprocket 130, the sprocket 130 including a plurality of vertices, wherein the sprocket 130 is attached to the axle 125 and configured to mesh with pitches of a helix of the auger via the hole in the surface of the hollow tube 110, wherein the sprocket 130 is configured to rotate and move the auger through the hollow tube 110, and to or from the device.

As shown in FIG. 1, it is contemplated that the mounting assembly 120 may be connected to the hollow tube 110 via u brackets 132, 134, connecting brackets, and a plurality of fasteners. However, it is contemplated that other types of connectors may be employed without departing from the scope and intent of the present disclosure. It is contemplated that system 100 is configured to install or remove an auger through the hollow tube 110 and into or out of a device.

Figure 2A:
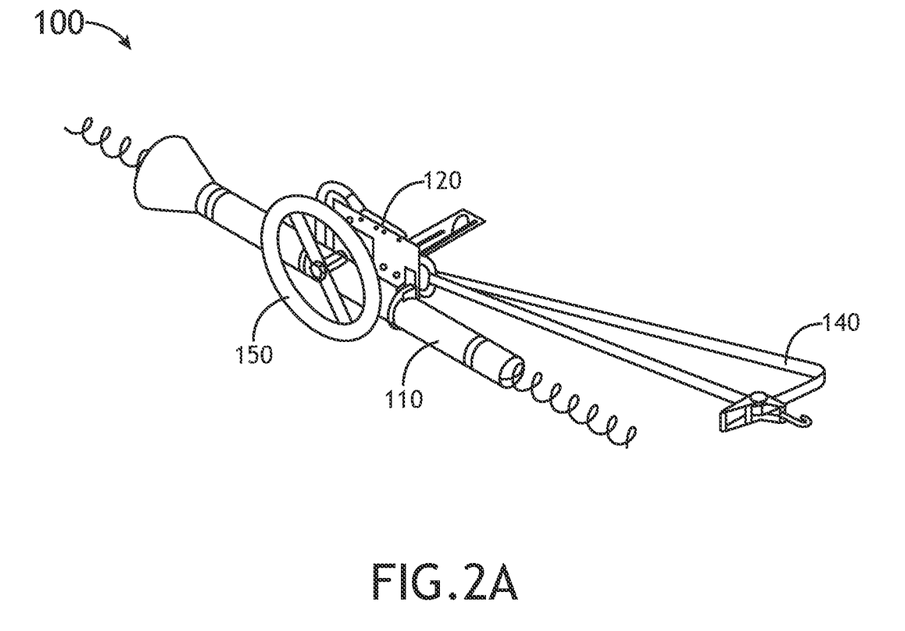
FIG. 2A depicts a perspective view of the system for installing or removing an auger in accordance with an exemplary embodiment of the present disclosure.
Figure 2B:
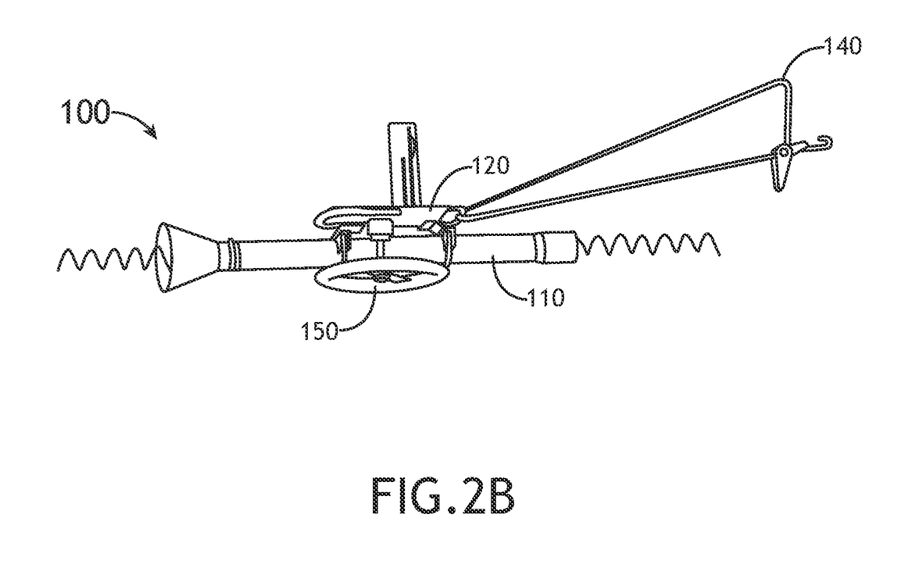
FIG. 2B depicts a top view of the system for installing or removing an auger in accordance with an exemplary embodiment of the present disclosure.
Figure 2C:
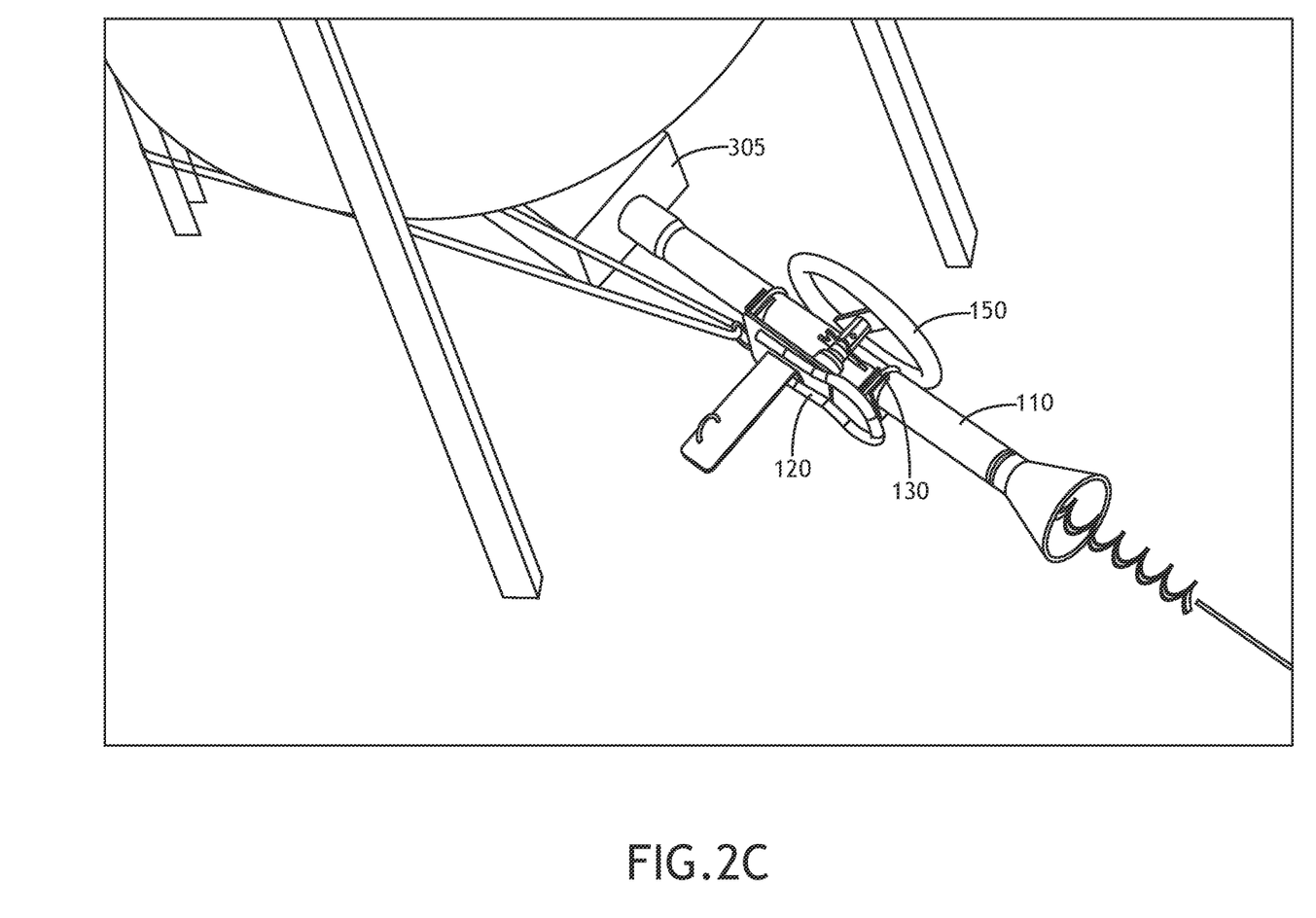
FIG. 2C depicts a view of the system for installing or removing an auger connected to a device in accordance with an exemplary embodiment of the present disclosure.

Referring to FIGS. 2A, 2B, and 2C, system 100 may further include a connector 140 to attach the system 100 to a piece of equipment or device. The connector 140 may be configured to secure the system 100 to a device. The connector 140 may be either flexible (e.g., a rope, ratchet strap, or bungee cord) or rigid (e.g., a clamp). The connector 140 may be designed to allow the pipe to be extendable, and therefore the connector 140 may have the ability to securely couple the system 100 via points on the system of varying distances relative to the same point on the device. Advantageously, the connector 140 may help secure the system and allow a user to focus on insertion or removal of the auger. The connector 140 may connect to a handle of receptable that is attached to the mounting assembly.

The piece of equipment or device, shown in an exemplary manner as element 305 in FIG. 2C, may be any type of device, machine or equipment using an auger, including, but not limited to, farm and industrial equipment. Further, the auger may be of any size appropriate for use with the corresponding device.

In an embodiment, the system 100 may have a hollow tube 110 to allow an auger to enter in a first opening at the first end of the hollow tube 110, pass through the hollow tube 110, and exit the other end of the hollow tube 110, therein entering the device 305. This hollow tube 110 may be of any shape (e.g., round, square, rectangular) and may have a size that has interior dimensions sufficiently large for the desired auger's diameter. The hollow tube 110 may also be made of any rigid material that is sufficiently durable to withstand an auger sliding through it and sufficiently strong to support the weight of a section of auger. For example, the hollow tube 110 may be formed from plastic (e.g., PVC), composite, or a metal (e.g., stainless steel or aluminum).

The hollow tube 110 may not be a single hollow tube. Any number of tubes may be coupled to each other, either permanently or non-permanently, in order to achieve the desired tube size and dimensions. In this way, the hollow tube 110 may have an adjustable length, (e.g., through a telescoping action or connection with additional hollow tubes) that may allow for easier storage, transport, or use of the system 100. Further, the system 100 may be configured to be used with augers of varying diameters with minimal adjustment. For example, hollow tubes of different diameters may be fitted within one another and upon the need for the system 100 to be used with a large diameter auger, hollow tubes of smaller diameters may be removed. Conversely, a tight fit for smaller augers may be desirable, and in such a case, hollow tubes of a smaller diameter may be added to the system to provide a tight fit for a smaller auger.

The system 100 may further include a crank 150. Crank 150 may be coupled to the axle of the mounting assembly 120. Crank 150 may be configured to be rotated, causing rotation of the axle 125 and subsequently rotation of the sprocket 130. Rotation of the sprocket may move an auger through the hollow tube 110. In one embodiment, crank 150 may be in the form of a circular frame. In another embodiment, crank 150 may be a hand crank.

Figure 3:
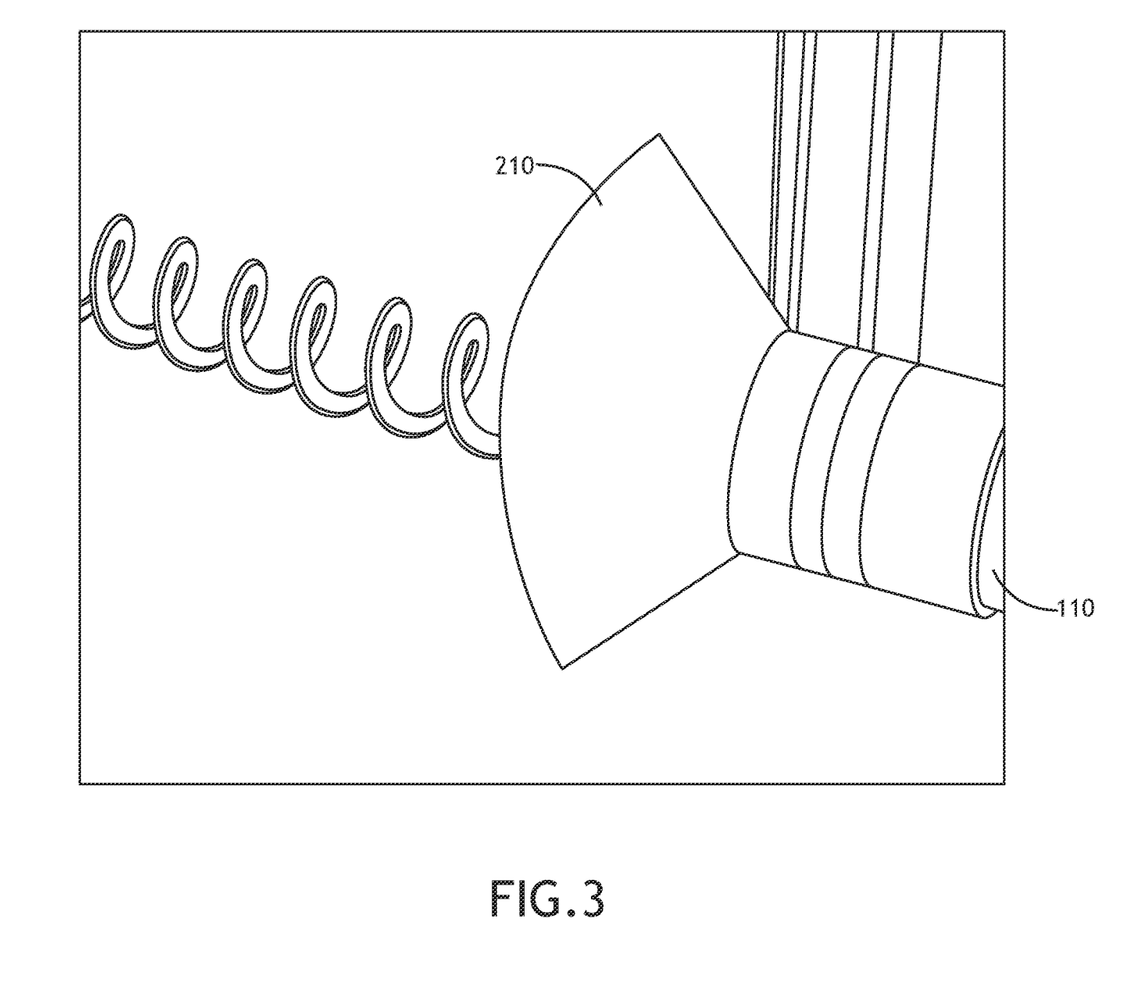
FIG. 3 depicts a first opening at a first end of the hollow tube in which an auger in installed or removed, in accordance with an exemplary embodiment of the present disclosure.

Referring to FIG. 3, a first opening 210 at a first end of the hollow tube 110 in which an auger in installed or removed is shown. The first opening 210 at the first end of the hollow tube 110 may be tapered outwards or have an attachable component that is larger than the hollow tube at one end and a similar size to a diameter of the hollow tube 110 on the other end (e.g., a funnel shape). The tapered opening or attachment may allow for easier installation of the auger by making it easier to begin the process of feeding the auger into the hollow tube 110 and more difficult for the helix of the auger to catch on edges of the hollow tube while the auger is being fed into the device.

Figure 4:
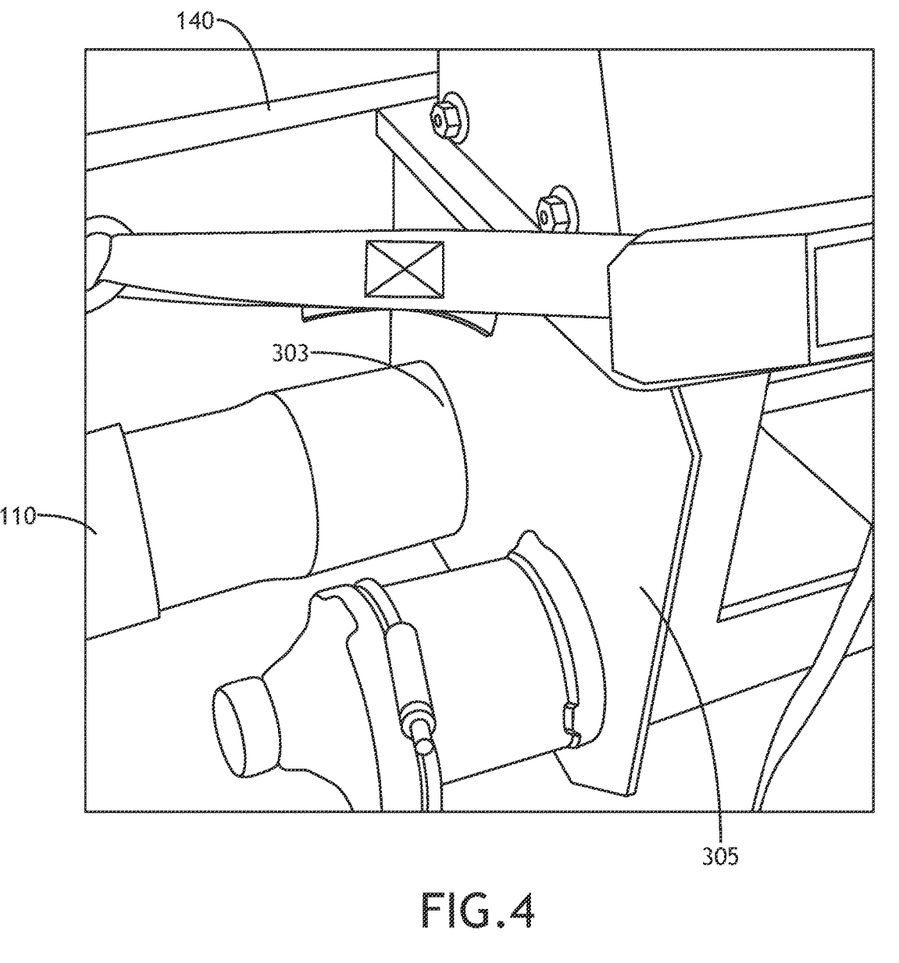
FIG. 4 depicts a second opening of the hollow tube at a second end of the hollow tube mating with an opening on a device, in accordance with an exemplary embodiment of the present disclosure.

Referring to FIG. 4, a second opening 303 of the hollow tube 110 at a second end of the hollow tube 110 mating with an opening on a device 305 is shown. A second opening 303 of the hollow tube 110 may be positioned near an opening on the device 305 to allow the auger to be fed into the device 305. The second end of the hollow tube 110 may be large enough where the face of the hollow tube and the face of the device 305 are in contact, without the second end of the hollow tube 110 entering the device 305. Conversely, the second end of the hollow tube 110 may have an outer diameter small enough to fit within the opening on the device 305. This may allow the auger to be fed into the device without the need to continuously align holes in two flat faces. Further, the second end of the hallow tube 110 may have a ridge that provides a stop to prevent an inserted section of the second end of the hollow tube 110 from being inserted too far into the device 305, possibly resulting in damage to the system 100 and/or device 305. In another embodiment, the auger may have a tube protruding from the entrance for the auger into the device. Alternatively, the second end of the hollow tube 110 may fit around or fit within the tube protruding from the entrance of the device 305 (e.g., the diameter of the second end of the hollow tube is larger or smaller than the diameter of the tube protruding from the entrance of the device 305).

In instances where the second end of the hollow tube sits flush on the surface of the device 305 without entering, the second end does not need to be flat. The second end may be of any geometry that allows a flush mating of the face of the second end and the face of the device 305 (e.g., rounded).

Figure 5:
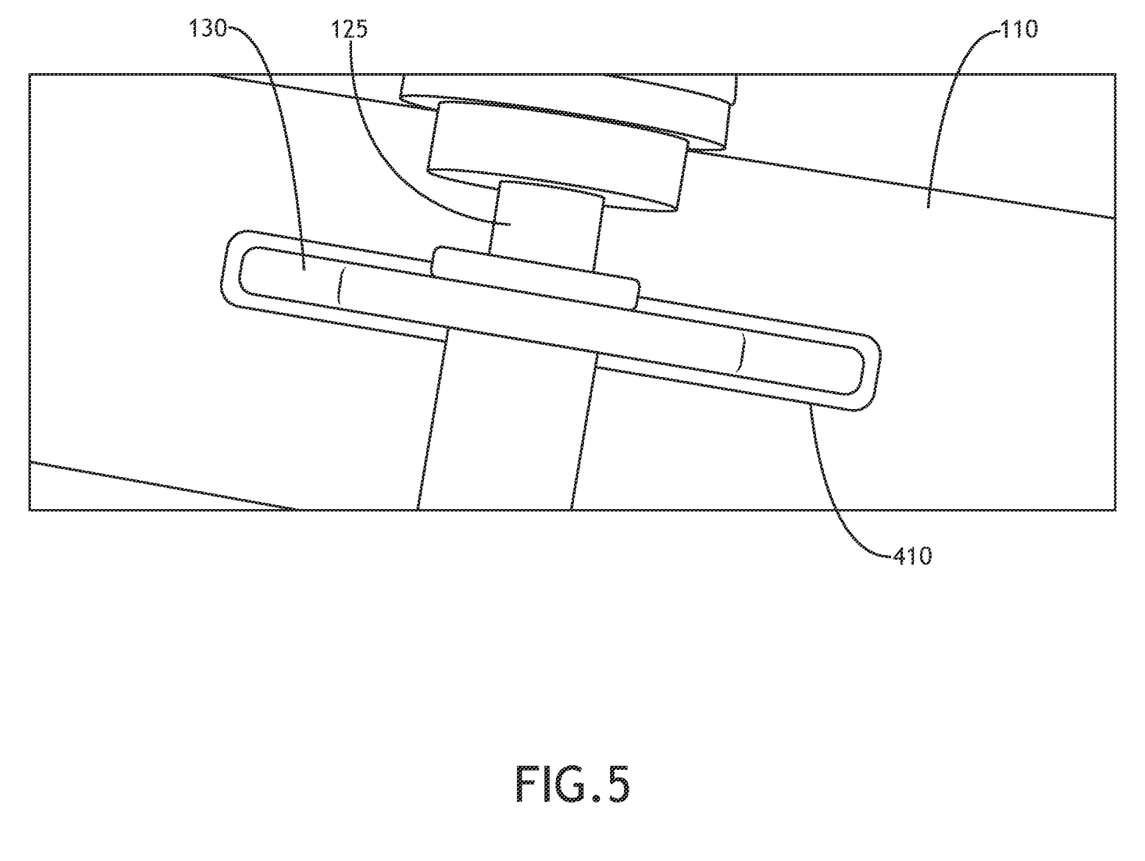
FIG. 5 depicts a top view of a hole in a surface of the hollow tube in which the sprocket passes in order to contact an auger, in accordance with an exemplary embodiment of the present disclosure.

Referring to FIG. 5, a top view of a hole 410 in a surface of the hollow tube 110 in which the sprocket 130 passes in order to contact an auger is shown. Sprocket 130 may be connected to an axle 125 which may reside outside of the hollow tube 110. The hole 410 may penetrate through a wall of the hollow tube 110. The hole 410 may be of any size and shape that provides enough space for a sprocket to pass through and contact the auger sufficiently to move the auger further through the hollow tube 110 of the system 100 and into the device. In an embodiment, the hole 410 may be large enough where a user can visually see the meshing of the sprocket 130 and the auger in order to monitor progress and determine if the speed and/or sprocket 130 being used are appropriate and effective. In another embodiment, the hole 410 may be limited to only the dimensions necessary for the sprocket 130 to contact and move the auger in order to keep environmental debris out of the system 100 and device.

It is further contemplated that in instances where a user is removing an auger, a user may choose to orient the system in a manner where the first end of the hollow tube 110 (an end with an tapered outer opening) is nearest to the device for the same reasons and advantages described herein.

Figure 6:
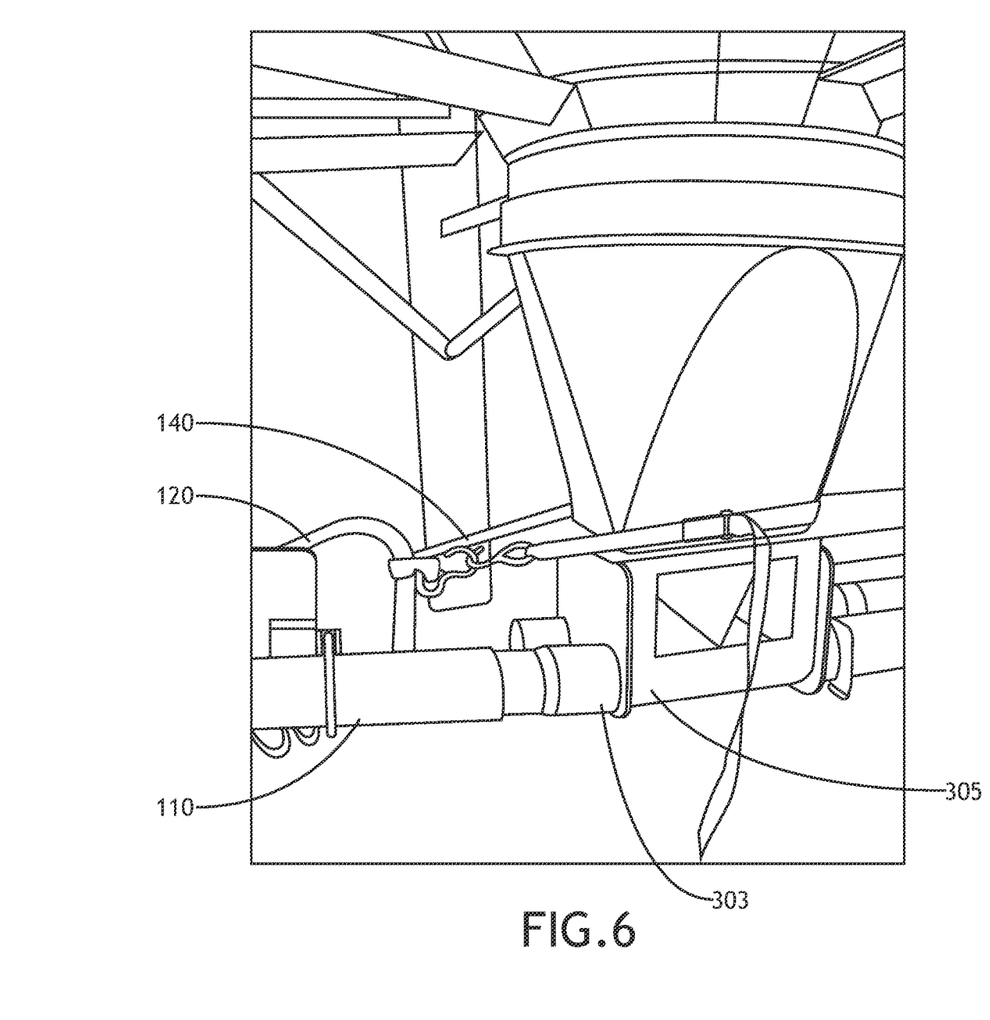
FIG. 6 depicts a connector which couples a mounting assembly to the device, in accordance with an exemplary embodiment of the present disclosure.

Referring to FIG. 6, a connector 140 which couples a mounting assembly 120 to the device 305 is shown. In this embodiment, connector 140 in a form of a strap couples the system by connecting a handle or receptacle of the mounting assembly 120 to the device 305. In an embodiment, the system 100 may have a connector 140 to couple the system 100 to the desired piece of equipment or a device 305. This connector 140 may be either flexible (e.g., a rope, ratchet strap, or bungee cord) or rigid (e.g., a clamp). The connector 140 may be designed to allow the pipe to be extendable, and therefore the connector 140 may have the ability to securely couple the system via points on the system of varying distances relative to the same point on the device 305.

In an embodiment, when coupling the system 100 to the device 305, the connector 140 attaches to a point on the device 305 and a point on the system 100. The connector 140 is then tightened to bring together the second end of the hollow tube 110 and the opening of the device 305. If the connector 140 has enough tension and the point of contact between the hollow tube 110 and the device 305 is sufficiently large and/or stable with a sufficient amount of compression between the two surfaces, the connector 140 may support some or all of the weight of the system, enabling a user to focus on stabilization or positioning of the system 110 instead supporting the weight of the system. The connector 140 may attach to any part of the system 100 or device 305 that is sufficiently strong to support the weight of the system 100 and an auger.

Figure 7:
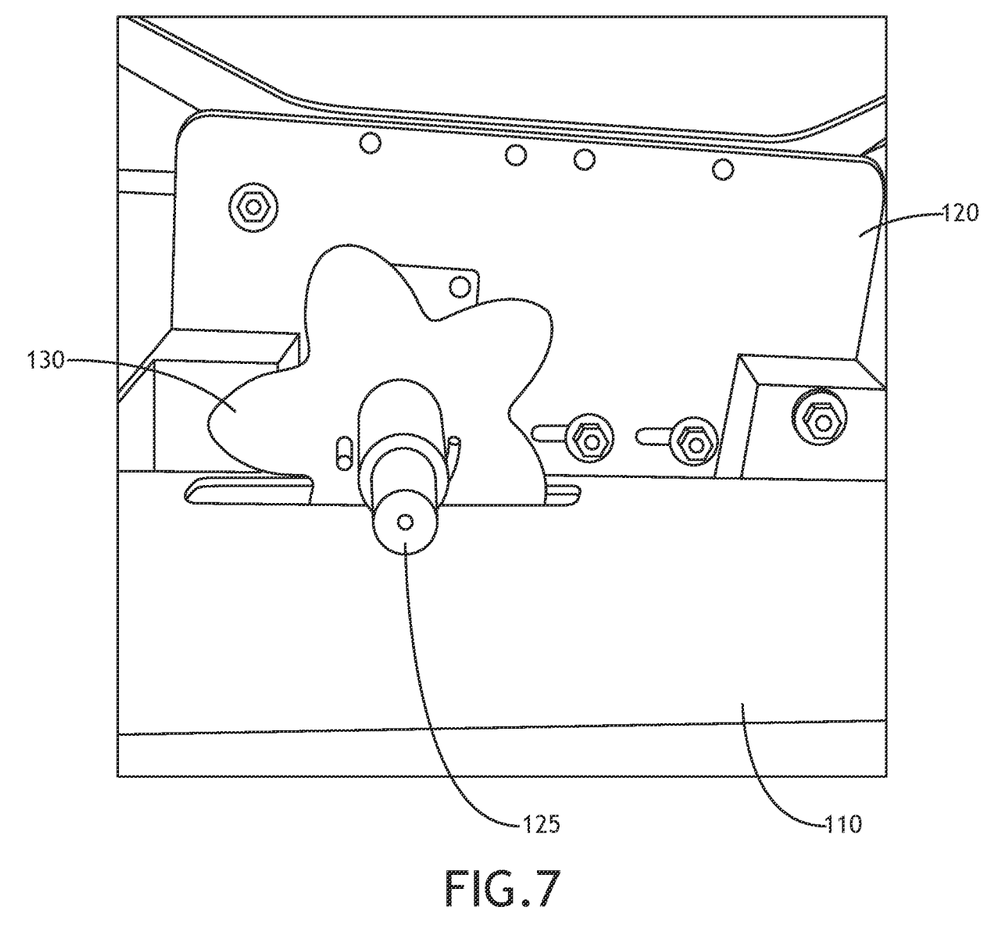
FIG. 7 depicts a sprocket coupled to an axle and inserted into a hole in the hollow tube, in accordance with an exemplary embodiment of the present disclosure.

Referring to FIG. 7, a sprocket 130 coupled to an axle 125 and inserted into a hole 410 in the hollow tube 110 is shown. The sprocket 130 may have any number of teeth/vertices (e.g., 5) located radially about a central point in any configuration or shape (e.g., a rounded star). The vertices of the sprocket 130 may fit within the pitch of the auger's helix and as the sprocket 130 rotates, the segments connecting the vertices contact the helix of the auger and apply a force, propelling the auger into or pulling the auger out of the device.

The number of vertices on the sprocket 130 and the speed that the sprocket 130 rotates may be determined and optimized for different sizes of augers. It is contemplated the sprocket may include at least two vertices, may include five vertices, and may include eight vertices. The optimal geometry and speed for the sprocket 130 may be determined by computational analysis or trial and error. For example, one size of auger may have an associated sprocket with a first optimal speed and an optimal number of vertices of five. By way of another example, a second size of auger may have an associated sprocket with a second optimal speed and an optimal number of vertices of eight.

The sprocket 130 may be coupled to an axle 125 to allow rotation of the sprocket 130. The sprocket 130 may be permanently coupled to the axle 125, or may be removable from the axle 125. In such a fashion, the axle 125 or the sprocket 130 may be changed to allow use of other sprockets 130 suitable for other types or sizes of augers.

Figure 8:
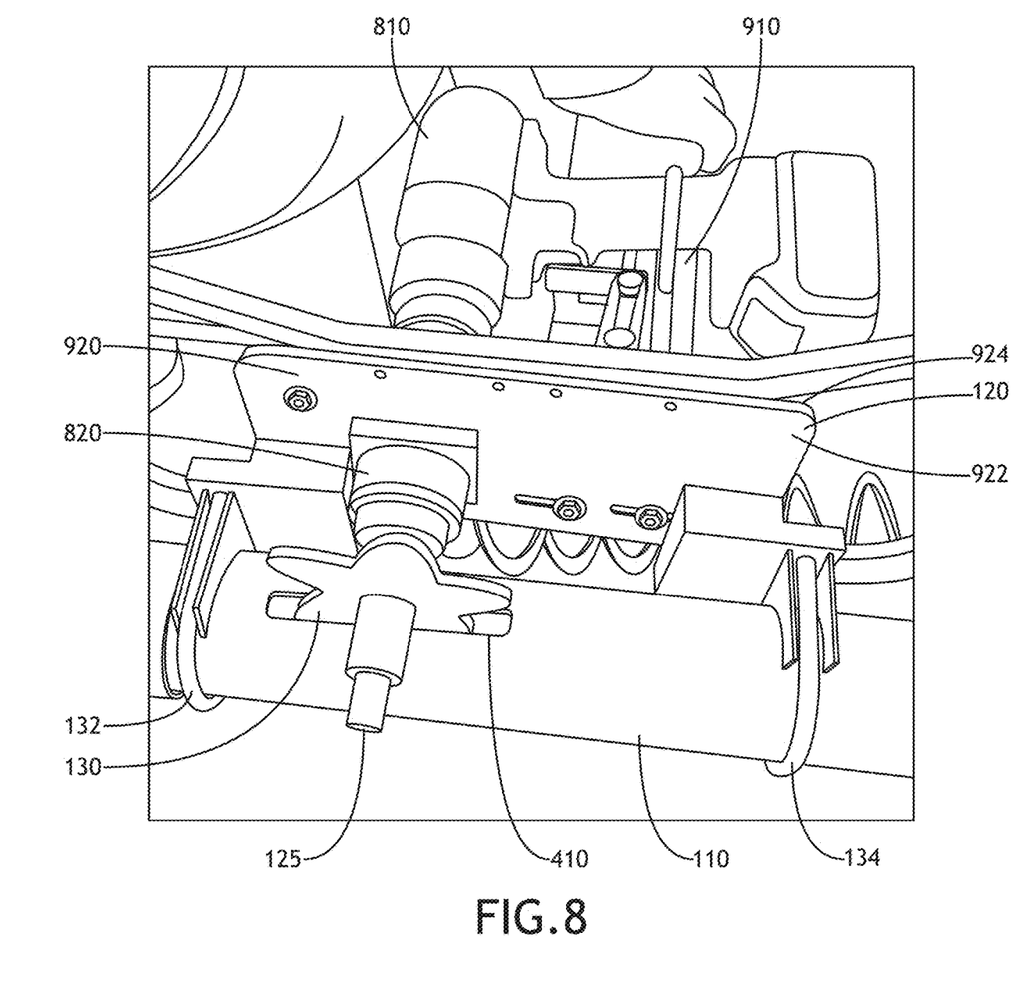
FIG. 8 depicts a top view of the mounting assembly with a drill, in accordance with an exemplary embodiment of the present disclosure.

Referring once again to FIGS. 2A-2B, a rotational mechanism, such as a crank 150, may be coupled to the axle 125 in order to induce rotation on the axle 125, thus causing the sprocket 130 to rotate. In another embodiment, a rotational mechanism may be a powered device, such as a power drill 810, may be used to connect with the axle 125 in order to rotate the axle 125, and cause rotation of the sprocket 130 as shown in FIG. 8. The power drill 810 may be powered by electrical power, or by hydraulic or pneumatic power. In an embodiment, the power drill 810 may be a cordless drill powered by one or more rechargeable batteries.

The rotational mechanism may include any motor that provides an appropriate amount of power at a desired rotational speed to install the auger (e.g., a drill or rotary motor). Any type of power source may be used to power the motor (e.g., rechargeable battery, DC current, AC current, or fuel). It is further contemplated that the sprocket 130 can be rotated manually (e.g., via a crank 150) to allow greater user control over the installation speed, while still benefitting from the installation system as a whole.

Further, the system 100 may be used to either install or remove an auger. Therefore, the rotational mechanism may turn in both a counterclockwise direction (e.g., to install the auger) and a clockwise direction (e.g., to remove the auger). A component on the rotational mechanism (e.g., a switch) may enable a user to select the direction of rotation.

In an embodiment where the rotational mechanism includes a motor, the user may further be able to control the speed at which the motor rotates via a user input device on the rotational mechanism, such as a power drill 810. The ability to control speed may be necessary to install augers of different sizes. For example, a heavier auger may need to be installed at a slower rate (moved through the system by the motor and sprocket at a slower speed) to prevent damage to the motor. To achieve this, the motor may be fitted with a user input device (e.g., a trigger, a dial, or a switch), that allows a user to control the rotational speed of the motor and rotate the sprocket at an optimal speed for the size of auger being installed.

As further shown in FIG. 8, mounting assembly 120 may include a plate 920, and may include an axle 125 integrated within the plate 920. The plate 920 may include a first side 922 and a second side 924. The plate 920 may be formed of a rigid material, such as metal, plastic, or composite. The axle 125 may be integrated within a hole in the plate 920, and may be configured to be rotated by a rotational mechanism. It is contemplated that the plate 920 of the mounting assembly 120 may connect to the hollow tube 110 at the first side 922 of the plate 920 via one or more u brackets 132, 134. The sprocket 130 is attached to the axle 125 in proximity to the first side 922 of the plate 920. A support 910 may be coupled to the second side 924 of the plate 920 and may be configured to hold a power drill 810.

In an embodiment of the disclosure, mounting assembly 120 may include a drive gear box 820. The drive gear box 820 may limit a speed of the rotation of axle 125 which may be more suitable for the installation and removal of the auger. For example, the drive gear box 820 prevent the axle 125 and sprocket 130 from rotating too fast.

Figure 9:
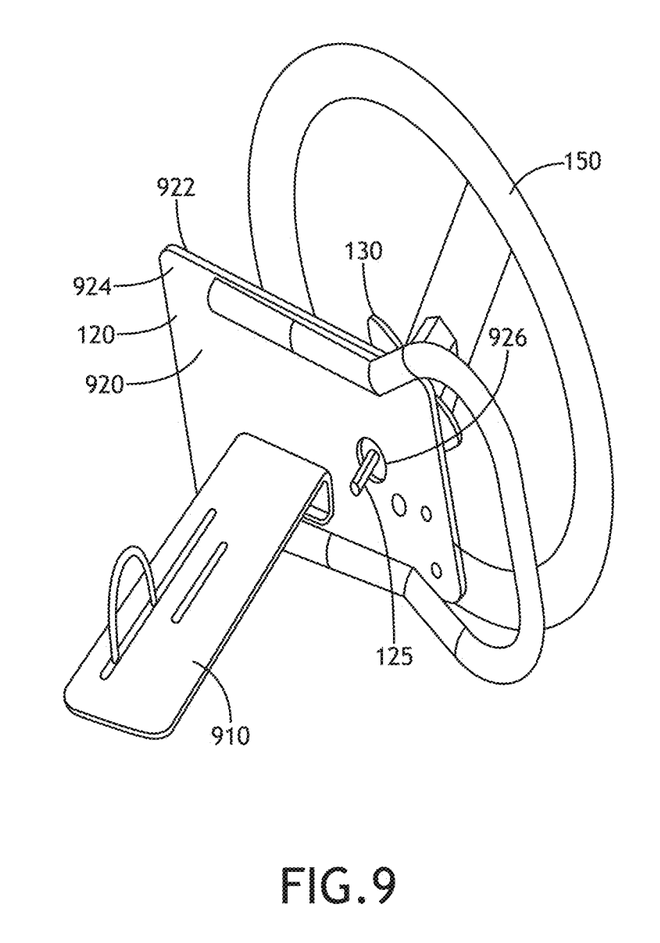
FIG. 9 shows a front view of the mounting assembly, in accordance with an exemplary embodiment of the present disclosure.

Referring to FIG. 9, an exploded view of the mounting assembly 120 is shown. Mounting assembly 120 may include a support 910 for the rotational mechanism such as a power drill 810 as shown in FIG. 8. The support 910 for the rotational mechanism may be adjustable, allowing for either different motors or manual modes of rotation to be used with the system 100, or for positioning of the sprocket 130 relative to the hollow tube 110 and the auger being installed. Further, the support 910 and the other components of the mounting assembly 120 may be coupled or positioned relative to each other in any orientation or through any mode of coupling. In this manner, the sprocket 130 may be operated at any orientation relative to the holder assembly (e.g., parallel, or orthogonal).

The mounting assembly 120 may be coupled to the hollow tube 110 in any manner appropriate. The mounting assembly 120 may either be non-permanently coupled (e.g., via u-clamps 132, 134) or permanently coupled (e.g., welded) to the hollow tube 110.

Further, the mounting assembly 120 may include a plate 920. Plate 920 may include a first side 922 and a second side 924. Plate 920 may include a hole 926 in which the axle 125 rotates within the hole 926. The one or more handles, receptacles, support 910, and couplers to the hollow tube 110 may be connected to the plate 920. A crank 150 may be coupled to the axle 125 in proximity to the first side 922 of the plate 920. The support 910 may be coupled to the second side 924 of the plate 920. The different components of the mounting assembly 120 may be coupled to the plate 920 (or in some embodiments to each other, or a combination of to each other and the plate) by one or more fasteners, or may be welded.

In an embodiment of the disclosure, a method is disclosed for installing an auger via the auger installation system 100.

The method may include a step of positioning the system 100 near the opening of the device that the auger should be installed or removed. The user may visually line up the second end of the hollow tube 110 with an opening of the device or insert the second end of the hollow tube 110 into an opening of the device in order for the auger to be fed into or removed from the device.

The method may further include a step of coupling the system to the device via a connector 140. The user who positioned the system relative to the device may continue to hold the auger in place while a second user attaches the connector 140 to a point on the system 100 and a point on the device, thus coupling the system to the device. The second user may then tighten the connector 140, at which point, the first user may cease supporting the weight of the system if there is sufficient tension in the connector and compression between the face of the second end of the pipe and a face of the device (or, if the second end of the pipe has been inserted into an opening of the device).

The method may further include a step of feeding the auger into the system. At this step, the first user may continue to stabilize and position the system so it is lined up with an opening of the device, while the second user begins to feed the auger into the tapered first end of the hollow tube 110, to the point where the auger is near or at the point where the sprocket may begin to contact and apply a force on the auger.

The method may further include rotating the sprocket 130 to either feed the auger into the device or remove the auger from the device. The first user may operate the rotational mechanism (a crank or motor device) to begin to feed the auger into the device, at which point the second user may continue to guide the auger into the system.

Each of the steps discussed above may be similarly applied to removing an auger from a device.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system for installing or removing an auger from a device, comprising:
   a hollow tube, the hollow tube including a first opening at a first end of the hollow tube and a second opening at a second end of the hollow tube, the hollow tube including a hole in a surface of the hollow tube,
   a mounting assembly, the mounting assembly being attached to the hollow tube, the mounting assembly including a plate, an axle, and a support, wherein the axle rotates within a hole of the plate, the plate including a first side and a second side, the hollow tube is coupled to the first side of the plate, the support is coupled to the second side of the plate and the support holds a power drill;
   a sprocket, the sprocket including a plurality of vertices, wherein the sprocket is attached to the axle in proximity to the first side of the plate and configured to mesh with pitches of a helix of the auger via the hole in the surface of the hollow tube, wherein the sprocket is configured to rotate by rotation of the axle and move the auger through the hollow tube.

2. The system of claim 1, further comprising a crank coupled to the axle in proximity to the first side of the plate to rotate the axle and sprocket.

3. The system of claim 1, further comprising the power drill, the power drill coupled to the axle to rotate the axle and sprocket.

4. The system of claim 1, wherein the mounting assembly is attached to the hollow tube via one or more u-clamps.

5. The system of claim 1, wherein the sprocket comprises at least two vertices.

6. The system of claim 1, wherein the first opening on the first end of the hollow tube includes a tapered opening.

7. The system of claim 1, wherein an inner diameter of the hollow tube is greater than a diameter of the auger.

8. The system of claim 1, wherein the hollow tube is formed of plastic or metal.

9. The system of claim 1, further comprising a connector which connects the mounting assembly to a device in which the auger is being installed or removed.

10. The system of claim 9, wherein the connector is a strap.

11. A system for installing or removing an auger from a device, comprising:
    a hollow tube, the hollow tube including a first opening at a first end of the hollow tube and a second opening at a second end of the hollow tube, the hollow tube including a hole in a surface of the hollow tube,
    a mounting assembly, the mounting assembly being attached to the hollow tube, the mounting assembly including a plate, an axle, and a support, wherein the axle rotates within a hole of the plate, the plate including a first side and a second side, the hollow tube is coupled to the first side of the plate, the support is coupled to the second side of the plate and the support holds a power drill;
    a sprocket, the sprocket including at least five vertices, wherein the sprocket is attached to the axle in proximity to the first side of the plate and configured to mesh with pitches of a helix of the auger via the hole in the surface of the hollow tube, wherein the sprocket is configured to rotate by rotation of the axle and move the auger through the hollow tube, wherein the mounting assembly is attached to the hollow tube via one or more clamps.

12. The system of claim 11, further comprising a crank coupled to the axle in proximity to the first side of the plate to rotate the axle and sprocket.

13. The system of claim 11, further comprising the power drill, the power drill coupled to the axle to rotate the axle and sprocket.

14. The system of claim 11, wherein the first opening on the first end of the hollow tube includes a tapered opening.

15. The system of claim 11, wherein an inner diameter of the hollow tube is greater than a diameter of the auger.

16. The system of claim 11, wherein the hollow tube is formed of plastic, composite, or metal.

17. The system of claim 11, further comprising a connector which connects the mounting assembly to a device in which the auger is being installed or removed.

18. The system of claim 17, wherein the connector is a strap.

* * * * *